United States Patent
Thatikonda et al.

(10) Patent No.: US 9,360,864 B2
(45) Date of Patent: Jun. 7, 2016

(54) TURBINE FAULT PREDICTION

(75) Inventors: Ravi Kanth Sai Thatikonda, Andhra Pradesh (IN); Subhash Nemani, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 886 days.

(21) Appl. No.: 13/444,763

(22) Filed: Apr. 11, 2012

(65) Prior Publication Data

US 2013/0274898 A1    Oct. 17, 2013

(51) Int. Cl.
*F02C 9/00*    (2006.01)
*G05B 23/02*    (2006.01)

(52) U.S. Cl.
CPC ............. *G05B 23/0224* (2013.01); *F02C 9/00* (2013.01); *F05D 2260/80* (2013.01); *F05D 2260/82* (2013.01); *G05B 23/02* (2013.01); *G05B 23/0283* (2013.01)

(58) Field of Classification Search
CPC ............. G05B 23/02; G05B 23/0224; G05B 23/0283; F02C 9/00; F05D 2260/80; F05D 2260/82
USPC ............. 700/44, 108, 287; 702/34, 181, 182, 702/187
See application file for complete search history.

(56) References Cited

U.S. PATENT DOCUMENTS

| | | | | |
|---|---|---|---|---|
| 7,113,890 B2* | 9/2006 | Frerichs | ............... | F22B 35/18 700/174 |
| 7,225,109 B2* | 5/2007 | Frerichs | ............... | G01H 17/00 702/179 |
| 8,712,739 B2* | 4/2014 | Jiang | ............... | F01D 21/003 703/2 |
| 8,825,567 B2* | 9/2014 | Jiang | ............... | G06N 99/005 706/12 |
| 2008/0201104 A1* | 8/2008 | Poncet | ............... | G05B 23/0229 702/181 |
| 2008/0228338 A1* | 9/2008 | Howard | ............... | G05B 23/0278 701/31.4 |
| 2009/0055070 A1* | 2/2009 | De | ............... | F02C 9/00 701/100 |
| 2010/0138267 A1* | 6/2010 | Vittal | ............... | F03D 11/0091 702/184 |
| 2011/0196593 A1* | 8/2011 | Jiang | ............... | F02C 9/00 701/100 |

* cited by examiner

*Primary Examiner* — Carlos Ortiz Rodriguez
*Assistant Examiner* — Jennifer L Norton
(74) *Attorney, Agent, or Firm* — Fletcher Yoder, P.C.

(57) ABSTRACT

A system is provided. The system includes an industrial controller configured to control and obtain current parameter data from one or more components of an industrial system. Further, a storage is included and is configured to store historical data comprising parameter data from the one or more components. The system also includes a prediction controller configured to receive the current parameter data from the industrial controller, receive the historical data from the storage, and to generate an overall predictive score based at least in part upon the current parameter data and the historical data. The overall predictive score represents a likelihood of a fault within the industrial process control system.

18 Claims, 5 Drawing Sheets

TURBINE FAULT PREDICTION

BACKGROUND OF THE INVENTION

The subject matter disclosed herein relates to gas turbine industrial control systems and, more specifically, to system-level failure prediction in the industrial control system.

Certain systems, such as industrial control systems, may provide for control capabilities that enable the execution of control instructions in various types of devices, such as sensors, pumps, valves, and the like. Additionally, certain industrial control systems may include one or more graphical user interfaces that may be used to present details to an operator about the various devices present on the control system network. For example, a graphical user interface may present an operator with alerts that may contain alarm or diagnostic information about a device on the control system network.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an industrial controller configured to control and obtain current parameter data from one or more components of an industrial system. Further, a storage is included and is configured to store historical data comprising parameter data from the one or more components. The industrial process control system also includes a prediction controller configured to receive the current parameter data from the industrial controller, receive the historical data from the storage, and to generate an overall predictive score based at least in part upon the current parameter data and the historical data. The overall predictive score represents a likelihood of a fault within the industrial process control system.

In a second embodiment, a system includes a system configured to receive predictive score data relating to a likelihood of future faults of a turbine system, wherein the predictive score data is based on historical data of one or more components relating to the turbine system and current data relating to the one or more components. The system is further configured to output an HMI image on a display, wherein the HMI image includes an indication of the predictive score data.

In a third embodiment, a method includes collecting current parameter data relating to one or more components of a turbine system, collecting historical data including one or more faults and parameter data associated with the faults, and generating a failure predictive score, trip predictive score, a shutdown predictive score, and a runback predictive score based at least in part upon the current parameter data and the historical data. The fault, trip, shutdown, and runback predictive scores represent a likelihood of a trip, a shutdown, and a runback, respectively, of the turbine system of the industrial process control system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The embodiments of the invention discussed below provide fault prediction of a turbo machine such as a turbine system (e.g., gas turbine, steam turbine, hydro-turbine, and/or wind turbine) within an industrial process control system (e.g., process plants, batch processing, rotating equipment, any industrial or consumer process, power plants, grid, switch gear, etc.). Rather than merely providing fault prediction based upon current component level parameter data, the techniques described herein provide system-level fault prediction based upon combined current parameter data of multiple components of the industrial process control system in conjunction with historical fault data within the system. Thus, a more accurate fault prediction, based upon the combination of a plurality of components within the system may be produced. Further the fault prediction is enhanced by understanding the history of faults within the system (e.g., whether such faults have been frequent, infrequent, etc. within the system).

Figure 1:
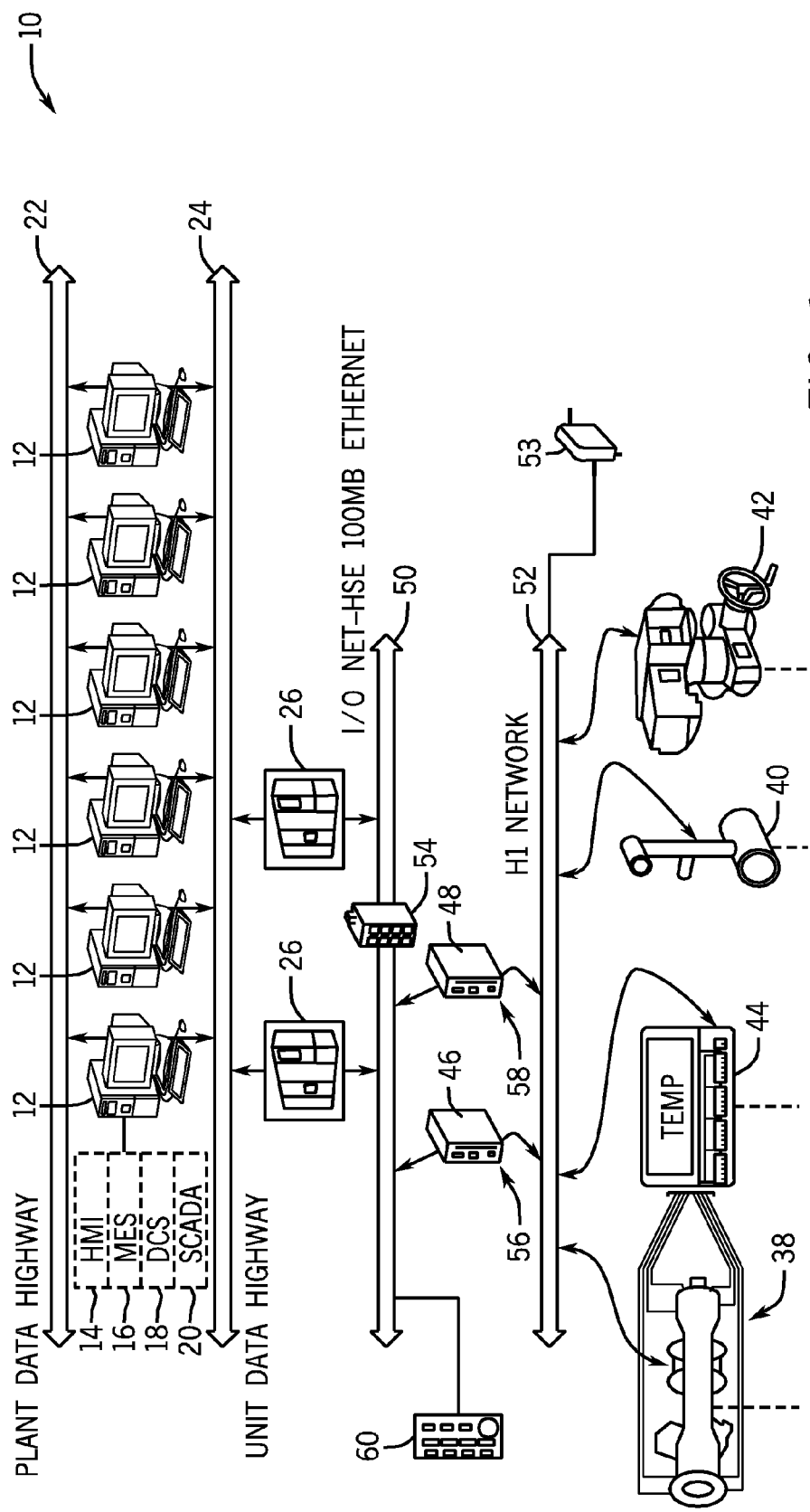
FIG. 1 is a schematic diagram of an embodiment of an industrial control system, including a system-level fault prediction system.

Turning to FIG. 1, an embodiment of an industrial process control system 10 is depicted. The control system 10 may include one or more computers 12 suitable for executing a variety of field device configuration and monitoring applications, and for providing an operator interface through which an engineer or technician may monitor the components of the control system 10. Each computer 12 may be any type of computing device suitable for running software applications, such as a server, a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. Each computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include computers 12 coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments, the system 10 may include one industrial controller 26, two industrial controllers 26, three, or more industrial controllers for redundancy. The industrial controllers 26 may enable control logic useful in automating a variety of plant equipment, such as a turbine system 38 (e.g., gas turbines steam turbines, hydro-turbines, and/or wind turbines), a valve 40, and a pump 42. Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), air separation units, gasifiers, compressors, gas treatment units, boilers, and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

A variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

Figure 2:
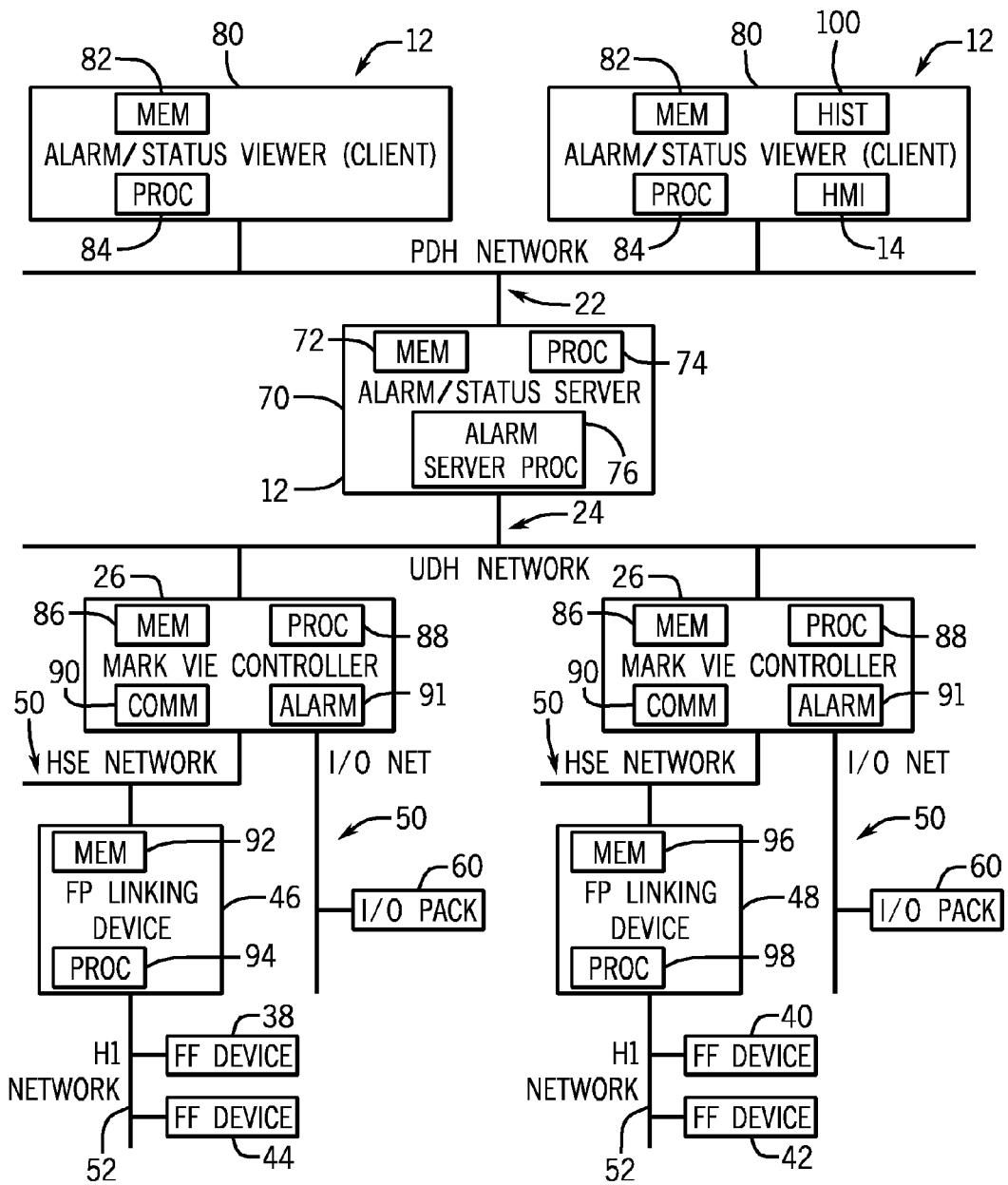
FIG. 2 is a block diagram including embodiments of various components of the industrial control system of FIG. 1.

In certain embodiments, the devices 38, 40, 42, and 44 may provide data, such as alerts, state, or measurement data, to the system 10. This data may be handled in accordance with the embodiments described below. FIG. 2 depicts a block diagram of an embodiment of the industrial process control system 10 depicting various components in further detail. As described above, the system 10 may include an alarm/status server 70, executed on the computer 12, coupled to the plant data highway 22 and the unit data highway 24. The computer 12 may include a memory 72, such as non-volatile memory and volatile memory, and a processor 74, to facilitate execution of the alarm/status server 70. The alarm/status server 70 may execute an alarm/status server process 76, which may be computer-implemented instructions stored on the memory 72, for receiving, processing, storing, and/or responding to alarms and/or status received from the controllers 26. Multiple controllers, such as the controllers 26 may be set up for redundant operations.

The system 10 may include additional computers 12 coupled to the plant data highway 22 that may execute alarm/status viewers 80. The alarm/status viewers 80 may enable a user to view and interact with the alarms and/or status that is processed by the alarm/status server 70. The computers 12 may each include a memory 82 and a processor 84 for executing the alarm/status viewer 80. Additionally, in some embodiments, the alarm/status viewers 80 may be executed on any computer 12 described above in FIG. 1. The alarm/status server 70 may communicate with the alarm/status viewers 80 using any suitable alarm data protocol interpretable by the alarm viewers 80.

As described above, the controllers 26 are coupled to the unit data highway 24, and the controllers 26 may communicate with the alarm/status server 70 over the unit data highway 24. For example, in one embodiment, the controllers 26 and alarm/status server 70 may communicate using a serial data interface (SDI) protocol. The controllers 26 may each include a memory 86 and a processor 88 for executing the functions of the controllers 26. In one embodiment, the controllers 26 may execute a communication process 90 and an alarm process 91. The communication process 90 may be used to interface with the field devices 38, 40, 42, and 44 while the alarm process 91 may be used to provide for a centralized facility suitable for distributing alarm information. As mentioned above, the controllers 26 may be coupled to the I/O pack 60 over the I/O NET 50. In one embodiment, the I/O pack 60 may communicate with the controllers 26 using the advanced digital logic (ADL) protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may also be coupled to the H1 network 52, and one linking device 46 may be coupled to devices 38 and 44 and another linking device 48 may be coupled to devices 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using a communication protocol (e.g., the Foundation Fieldbus protocol) to provide parameter data such as gas supply pressures, fuel-gas-temperature, liquid fuel flows, flame temperatures, combustion dynamics, ambient air temperature, exhaust-temperature, exhaust emissions, clearance measurements between rotating and stationary parts, and/or states of components within the system 10 (e.g., compressors, turbine blades, valves (e.g., control valve performance), switches, etc.) The parameter data may be either digital or analog. For example, the data may include analog temperature and/or flow rate data and/or digital data such as Boolean status data pertaining to the state of various components within the system 10.

As the parameter data from the field devices 38, 40, 42, and 44 are propagated through the linking devices 46 and 48 and the controllers 26 to the computers 12, such as one hosting the HMI software 14, may store the data, such that historical data relating to one or more of the field devices 38, 40, 42, and/or 44 may be maintained. The historical data 100 may be associated with fault information of the system 10. For example, the historical data 100 may include an identifier for a specific fault that occurred, the number of times the fault has occurred, and field device fault data (e.g., parameter data obtained from the field devices 38, 40, 42, 44 at the time of the fault).

As will be discussed in more detail below, based upon the historical data 100 and the current field device data, the controllers 26 or other processor equipped computers, may calculate a prediction of future fault in the system 10. For example, the fault prediction may determine a likelihood that a fault, trip, shutdown, and/or runback may occur on the turbine system 38. When a trip occurs, an air and/or fuel supply is immediately removed from the turbine system 38 (e.g., gas turbine engine), causing any flames within the turbine system 38 to be extinguished. When a shutdown occurs, the speed of the turbine system 38 is slowly reduced (e.g., from 3000 RPM to 0 RPM) by slowly reducing the air and fuel supply from the turbine system 38. When a runback occurs, the load (e.g., electrical generator) on the turbine system 38 may be reduced (e.g., a gradual tapering from 100 megawatts downward), allowing the faulting action to be corrected. While one controller 26 may provide all of the controller 26 functionality described herein, as mentioned above, the system 10 may include additional controllers 26. In some embodiments, it may be useful to dedicate future fault predictions to a dedicated controller 26 that communicates with the HMI software 14 and other components of the system 10.

Upon predicting a future need for a trip, shutdown, or runback, the controllers 26 or other processor enabled computers may provide the prediction and/or other information about the prediction (e.g., information about the parameters (or a subset of the parameters) that are influencing the prediction) to a computer 12 (e.g., the computer 12 hosting the HMI software 14). The prediction and/or other information about the prediction may be processed by the computer 12 and displayed to an operator of the computer 12, thus allowing the operator to understand, preempt, and/or react to the prediction.

Figure 3:
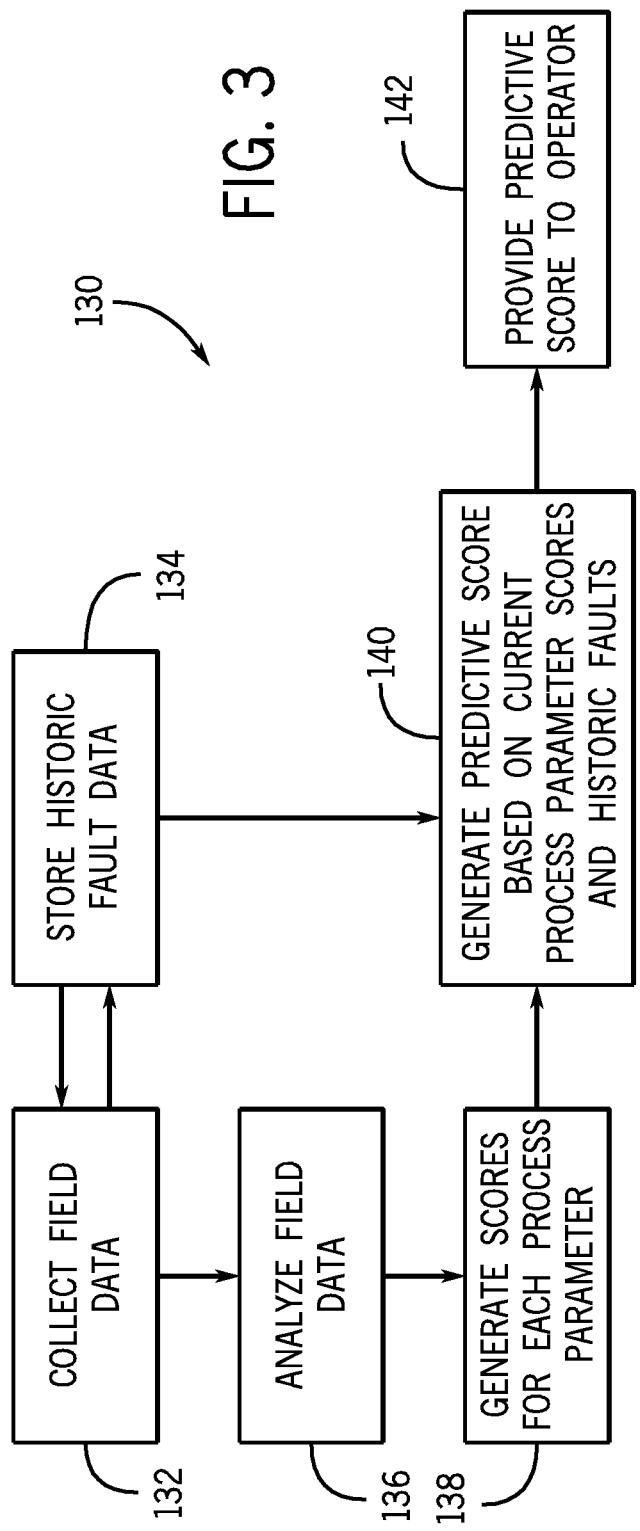
FIG. 3 is a flowchart of an embodiment of a process for predicting system-level faults.

FIG. 3 illustrates an embodiment of a process 130 for predicting a fault (e.g., a trip, shutdown, or runback) of the turbine system 38 in the industrial control system 10. As discussed above, the controllers 26 monitor and collect field data from components of the system 10 (block 132). The data is stored in a historical data bank (e.g., a database or file on non-transitory computer-readable media) (block 134). For example, the historic data may be stored on the computer 12 hosting the HMI software 14, a computer 12 that is dedicated to storing and providing historical fault data, or any other computer 12 within the system 10. The collected field data may be scanned and analyzed (block 136). This process of scanning and analyzing the collected field data may occur continuously as the system 10 is in operation, or may occur at set intervals (e.g., every 5, 10, 30, or 45 minutes). Based upon the analyzed field data and predefined relationships or correlations, the controller 26 or other processor enabled computer may derive a prediction value based upon the current field data (e.g., a current process predictive score for each process parameter) (block 138). The relationships or correlations may include mathematical equations, lookup tables, software models, or a combination thereof. For example, in some embodiments, the predefined relationships (e.g., mathematical equations) may weigh the parameter data based upon the severity of a deviation from normal operating parameters.

The controller 26 or other processor enabled computer may then retrieve the historic data 100 and derive a final predictive score based upon the current process predictive score and the historic data 100 (block 140). For example, the historic data 140 may include a historic fault score that may be directly applied to the current process predictive score to obtain the final score. For example, a number of times and/or severity that a parameter has deviated from normal operating parameters may be useful in predicting a future fault. The more often and/or severe the deviation, the more volatile the system. Thus, the final score may increase as the number of times and/or magnitude of severity of one or more parameters within the system 10 deviate from normal ranges increases.

In one example, a motor component of the system 10 may begin to fail. Motor sensors within the system 10 may detect a deviation from the range of normal revolutions per minute (RPMs) for the motor. Thus, the prediction value based upon the current field data may increase. Further, over time, the duration of the deviation or the number of times the deviation occurs may be stored as historical data. As the number of deviations, the magnitude of the deviation, and/or the deviation duration increases, the final predictive score may increase, thus notifying the system 10 of an increased likelihood of a trip, shutdown, or runback. It is important to note that because the controller 26 is connected to a variety of components within the system 10, predictive scoring may look beyond component level fault predictions, towards system-level fault predictions based upon the parameters of a multitude of components (e.g., 2 to 1000 components or more) used in conjunction with one another.

In some embodiments, the historical data 100 may correlate system 10 events and parameters with previous trips, shutdowns, and/or runbacks within the turbine system 38. For example, the historical data 100 may contain data suggesting that during a previous turbine system 38 trip, the time between a command to open a gas control value and the value actually providing an indication that the value was opened exceeded 4 time units (e.g., 1 second, 1 minute, 5 minutes, or 1 hour blocks of time). Thus, the historical data 100 may correlate a higher likelihood of a trip as the time units between subsequent commands to the gas control value and the indication that the value was opened. Thus, the prediction value based upon the current field data may be derived based upon the current time duration between an open command being sent and receiving a state update that the value has been opened. As this duration progresses towards 4 time units, the predictive score may increase, signifying an increase prediction that a trip may occur based upon the current data. Further, the historical data 100 may record a number of times that previous trips occurred under similar conditions. As the number of occurrences increases, the final predictive score may increase.

In one example, the prediction may be based upon combined parameter data of a liquid fuel system in combination with parameter data of a gas fuel system. When predictions based upon only one of the fuel systems are used, inaccurate predictions may arise. For example, when predicting based upon a component level, a low liquid fuel supply may predict problems for the turbine system 38. However, such prediction does not account for sufficient alternative fuel supply components (e.g., a gas fuel system) that may maintain proper operation of the turbine system 38. Thus, by not accounting for other components of the system 10, a less accurate prediction may be provided to operators of the system 10. Such predictions may result in less efficient operation of the turbine system 38 and may increase wear of the turbine system 38.

It is noted that from time to time, it may be desirable to reset the historical data 100, such that at least a portion of the historical data 100 does not impact the final predictive score. For example, in the motor failure example above, an operator of the system 10 may replace the failing motor with a new motor. Thus, historical data 100 relating to the failing motor may not apply to the new motor, and thus may provide false predictions within the system 10. Therefore, the operator may be enabled to reset at least a portion of the historical data 100, such that the historical data 100 is not used in future predictions. In certain embodiments, the operator is enabled, through the HMI software 14, to archive or purge historical data 100 relating to a specific parameter or component of the system 10. For example, the operator may select an option in the HMI software 14 to archive the historical data 100 relating to the failing motor. Upon submitting the request to archive the historical data 100, a processor within the computer 12 may cause the failing motor's historical data 100 to be moved to archived storage (e.g., a dedicated archival file or storage system). In some embodiments, the operator may simply request that the data be purged, thus causing the processor to delete the historical data 100 pertaining to the failing motor. Because the historical data 100 is very useful in predicting system-level faults, it may be beneficial to hinder unauthorized resets of the historical data 100. Thus, such functionality, whether in the HMI software 14 or elsewhere, may include password protection algorithms to ensure that the historical data 100 is reset only by authorized individuals.

Figure 4:
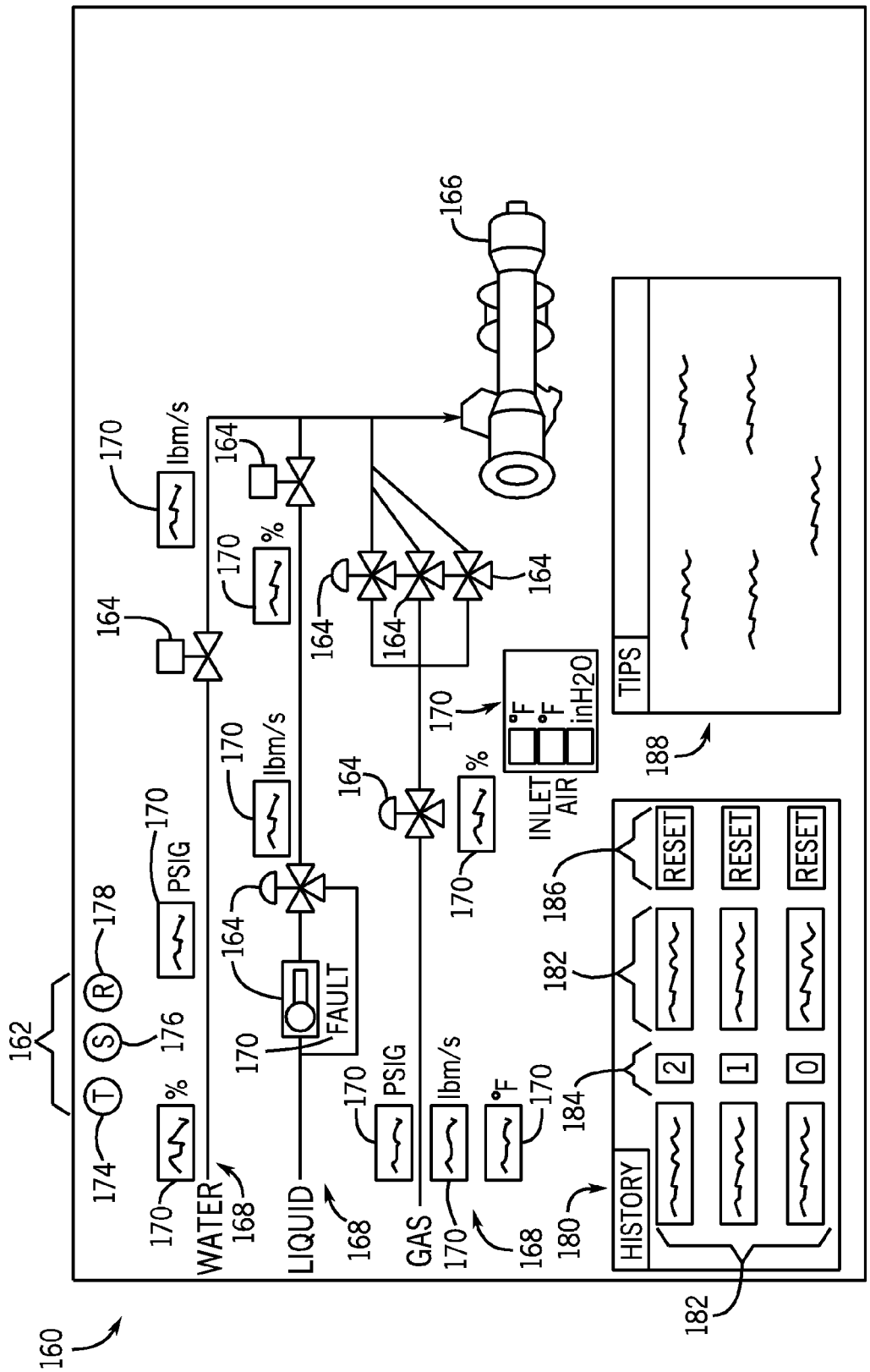
FIG. 4 is a schematic diagram of an indication system.

After the final score is generated, it is provided to a system 10 operator (block 142). For example, the final score and/or supporting data such as information regarding the parameter impacting the final score may be transmitted to the HMI software 14, where the score is displayed to the operator. FIG. 4 is an embodiment of an HMI display 160 that provides a quick indicator 162 of the predicted trip, shutdown and/or runback scores. The HMI display 160 may include visual representations 164 of various equipment connected to the turbine system 38 (visually represented by turbine image 166 (e.g., gas turbine engine)). The HMI display 160 may also include visual representations 168 of various flows (e.g., water, liquid, and/or gas flows) that are connected to the turbine system 38. Liquids may include liquid fuels, lubricants, etc. Gases may include gas fuels, oxygen, nitrogen, air stea, or any combination thereof. Further, the HMI display 160 may include indicators 170 of various measurements, states, etc. of the equipment and/or flows. Thus, the representations 164, 168, and indicators 170 may provide graphical representations of parameter data (e.g., flow rates, temperatures, pressures, composition, etc.) obtained via the controllers 26 or other devices in the system 10.

As illustrated, the quick indicator 162 may include a fault indicator, a trip indicator 174, a shutdown indicator 176, and/or a runback indicator 178. Even though the quick indicator 162 is enabled to provide quick identification of potential problems based upon the computer prediction, the indicators 174, 176, and 178 may provide different levels (e.g., low, medium, high) of potential problems that are likely to cause a fault. In some embodiments, the indicator 162 may vary in color as the potential likelihood of a trip, runback, and/or shutdown increases. For example, in some embodiments, the indicators 174, 176, and 178 may be green when the monitored parameters of the system 10 are all performing normally, with little potential likelihood of a trip, shutdown, or runback. As potential issues are detected by the controller 26 or other processor enabled computers, the indicators 174, 176, and/or 178 may change to a yellow color, indicating that something is wrong. As the potential problems increase (e.g., the predictive scores increase), and the likelihood that a trip, shutdown, or runback will occur becomes more eminent, the indicators 174, 176, and/or 178 may change to red, indicating that unless some parameter is controlled or other action is taken, a trip, shutdown, or runback is likely to or will occur. In alternative embodiments, the indicators may change on a more granular level, providing an even more detailed display of accuracy. For example, the indicators 174, 176, and 178 may change color slightly over time as problems begin to arise. In some embodiments, the indicators 174, 176, and 178 may become darker as the likelihood of a trip, shutdown, or rollback occurring increases (e.g., as the predictive score increases).

In some embodiments, the HMI display 160 may provide a history display section 180 that provides identification information 182 of previous faults and/or parameter data corresponding to those faults. Further, a counter 184 may be provided that indicates the number of times a given fault has occurred. The HMI display 160 may include a reset interface (e.g., reset buttons 186) that enable an operator of the HMI software 14 to reset (e.g., delete or archive) historical data for at least a portion (e.g., for one fault) of the historical data. The HMI display 160 may also include a tips section 188 that provides an operator guidance on how to modify the system 10 to reduce the likelihood of a new trip, shutdown, or runback based upon the current state of the system 10, the final score, the historical data, or a combination thereof. For example, the HMI software 14 may be configured to display operator-readable instructions based upon the parameter data that is causing the likelihood of a trip, shutdown, or runback to increase. The tips may be stored in a tip database and accessed by the computer 12 by querying the tip database for tips specific to the parameter data, the final score, the historical data, or a combination thereof.

Figure 5:
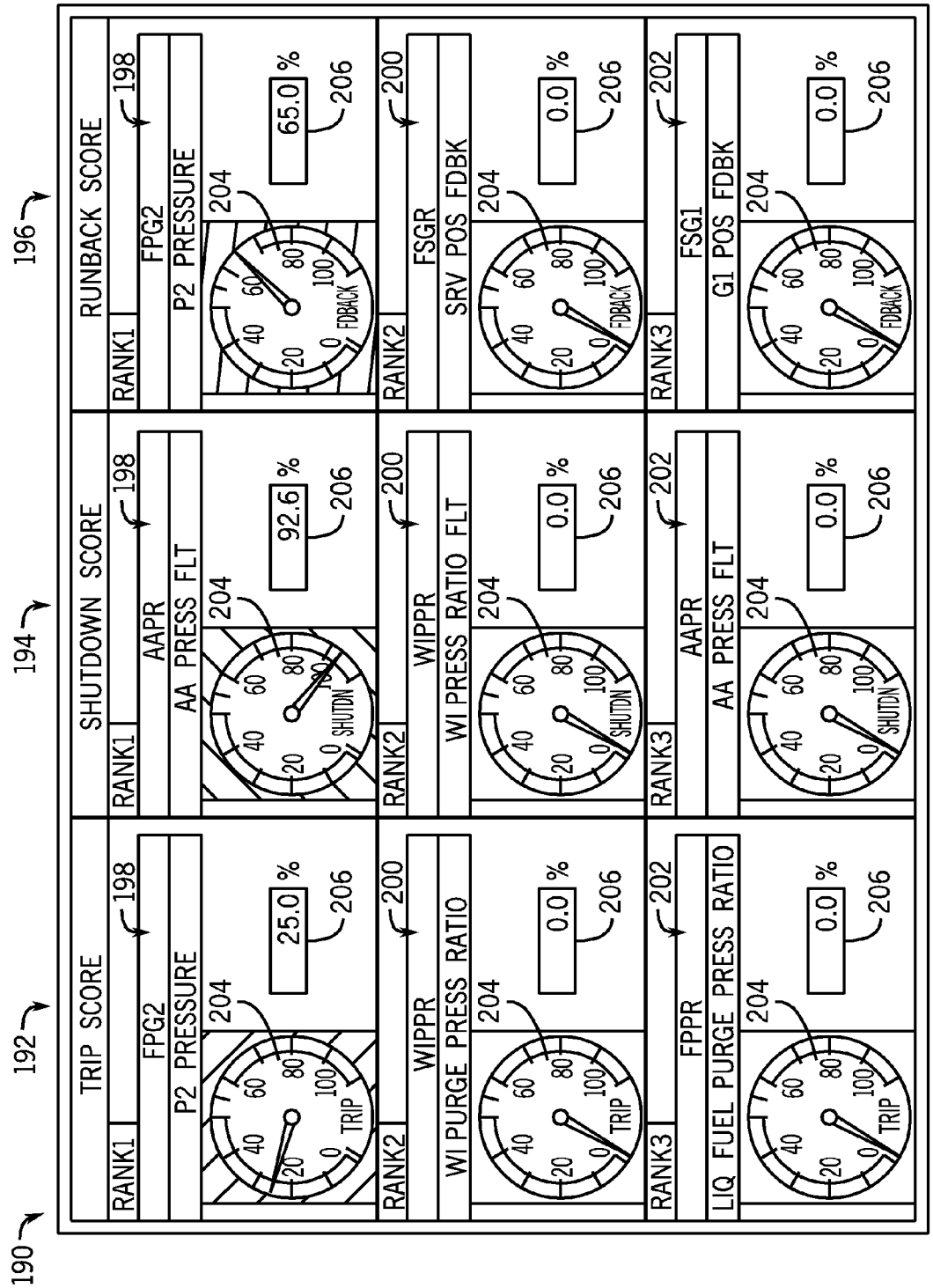
FIG. 5 is an embodiment of an information panel, providing system-level fault information.

Further, in some embodiments, the HMI display 160 may provide more detailed information regarding predictions made by the system 10. For example, in some embodiments, the HMI display 160 may allow an operator to click or select the quick indicator 162 to access a more detailed prediction screen. FIG. 5 illustrates one embodiment of a detailed prediction screen 190 that may displayed on the HMI 14 and/or HMI display 160. The detailed prediction screen 190 may provide detailed information explaining factors that were used in determining the trip, shutdown, and/or runback likelihood (e.g. on a scale from 0 to 100% probability). For example, in the illustrated embodiment, a trip score column 192, a shutdown score column, 194, and a runback score column 196 are provided. In the illustrated embodiment, each of the columns 192, 194, and 196 provide the top three parameters (198, 200, and 202) used in the prediction. For example, to determine the trip score (e.g., trip prediction), the controller 26 or other processor enabled computer utilized the FPG2 P2 Pressure parameter as its primary importance parameter 198. The WIPPR WI Purge Press Ratio was selected as the secondary importance parameter 200 and the FPPR Liquid Fuel Purge Press Ratio was used as a third importance parameter 202. Further, the shutdown score was determined based upon the AAPR AA press fit parameter, the WIPPR WI press ratio flt parameter, and the AAPR AA press flt parameter, as the first 198, second 200, and third 202 parameters. The runback score was determined based upon the FPG2 P2 Pressure parameter, the FSGR SRV Pos fdbk parameter, and the G1 Pos fdbk parameter, in that order.

It is important to note that while only three parameters (198, 200, and 202) are shown in each column (192, 194, and 196), other parameters may contribute to the predictions. For simplicity, the current embodiment was limited to the top three parameters that factored into the prediction. In alternative embodiments the number of parameters listed may differ. For example the screen 190 may show 1 to 100 (e.g., 1, 2, 3, 4, 5, 6, 7, 8, 9, 10, or more) parameters for each of the trip score, shutdown score, and the runback score. Any number of parameters may be tracked, monitored, and/or considered, regardless of how many are shown on the display. For example, 2 to 1000, 10 to 750, 20 to 500, or 30 to 100 parameters, each associated with a component of the system, may be tracked, monitored, and/or considered.

Each parameter (198, 200, 202) that is displayed may include a meter 204 or other graphical visualization and/or a textual visualization 206. The meter 204 and/or textual visualization 206 may provide an indication of the likelihood that a trip, shutdown, or runback will occur based upon the particular parameter described. For example, the meter 204 and textual visualization 206 associated with the FPG2 P2 Pressure parameter illustrates that a prediction that there is 25% probability of a trip is based upon the FPG2 P2 Pressure parameter. Further, in some embodiments, the background surrounding the meter 204 or the parameters (198, 200, 204) may indicate the degree of impact the parameter is having on the prediction. For example, the color red may indicate a parameter that is causing the likelihood of a trip, shutdown, or runback to be 60% or higher, yellow may represent that a parameter is causing the likelihood to be between 50%-60%, and green may represent that a parameter is causing the likelihood to be between 0%-50%. It is important to note that these ranges are provided merely as an example, and are not intended to limit the ranges represented by the various colors of the background 208.

Technical effects of the invention include techniques for monitoring components of an industrial control system to provide system-level predictions of faults within a turbine system of the industrial control system. For example, the prediction system may predict a likelihood that a trip, shutdown, or runback will occur based upon the current parameters of various components in the control system applied to historical fault data. Unlike many traditional component-focused feedback systems, the system-level prediction may provide predictions based upon combined parameter measurements/feedback from various components of the industrial control system in conjunction with one another. Parameter values (e.g., temperatures, pressures flow rates, exhaust emissions, clearance measurements, combustion dynamics, etc.) from components (e.g., valves, pumps actuators, compressor, fuel nozzles, turbines) and/or combinations of components may be weighted based upon importance. Such importance may be derived based upon historical data recorded by the industrial control system. By providing a system-level prediction based upon current and historical data, operators of the industrial control system may more accurately control the industrial control system, such that fewer trips, shutdowns, and/or runbacks may occur at the turbine system, thus producing less wear and tear on the turbine system, while operating with fewer turbine outages.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a turbine system;
an industrial controller configured to control and obtain current parameter data from one or more components of an industrial system, the one or more components comprising the turbine system;
a storage configured to store historical data comprising one or more faults and parameter data associated with the faults for the one or more components;
a prediction controller configured to:
  collect the current parameter data relating to the one or more components from the industrial controller;
  collect the historical data from the storage; and
  generate a trip predictive score, a shutdown predictive score, and a runback predictive score based at least in part upon the current parameter data and the historical data, wherein the trip, shutdown, and runback predictive scores represent a probability of a trip, a shutdown, and a runback, respectively, of the turbine system;
wherein generating the trip predictive score, the shutdown predictive score, and the runback predictive score comprises:
  determining a current trip predictive score, a current shutdown predictive score, and a current runback predictive score based upon the current parameter data;
  determining a historical trip predictive score, a historical shutdown predictive score, and a historical runback predictive score based upon the historical data; and generating the trip predictive score, the shutdown predictive score, and the runback predictive score by combining the current trip, the current shutdown, and the current runback predictive scores to the historical trip, historical shutdown, and historical runback predictive scores, respectively.

2. The system of claim 1, comprising a common controller having the prediction controller and the industrial controller.

3. The system of claim 1, wherein the prediction controller is configured to generate overall predictive scores representing the probability of a trip, a shutdown, a rollback, or combination thereof, of the turbine system.

4. The system of claim 1, wherein the prediction controller is configured to provide the at least one of the trip predictive score, the shutdown predictive score, or the runback predictive score to a human-machine interface (HMI).

5. The system of claim 1, wherein the prediction controller is configured to:
generate a current process predictive score based upon the current parameter data;
generate a historical predictive score based upon the historic data; and
generate at least one of the trip predictive score, the shutdown predictive score, or the runback predictive score by combining the current process predictive score to the historical predictive score.

6. The system of claim 1, wherein the prediction controller is configured to update at least one of the trip predictive score, the shutdown predictive score, or the runback predictive score continuously or in periodic intervals as the industrial system is in operation.

7. The system of claim 1, comprising the industrial system, wherein the industrial system comprises a gas turbine engine drivingly coupled to an electrical generator.

8. A system, comprising:
a processor configured to:
collect current parameter data relating to one or more components of a turbine system;
collect historical data comprising one or more faults and parameter data associated with the faults for the one or more components; and
generate a trip predictive score, a shutdown predictive score, and a runback predictive score based at least in part upon the current parameter data and the historical data, wherein the trip, shutdown, and runback predictive scores represent a probability of a trip, a shutdown, and a runback, respectively, of the turbine system;
wherein generating the trip predictive score, the shutdown predictive score, and the runback predictive score comprises:
determining a current trip predictive score, a current shutdown predictive score, and a current runback predictive score based upon the current parameter data;
determining a historical trip predictive score, a historical shutdown predictive score, and a historical runback predictive score based upon the historical data;
generating the trip predictive score, the shutdown predictive score, and the runback predictive score by combining the current trip, the current shutdown, and the current runback predictive scores to the historical trip, historical shutdown, and historical runback predictive scores, respectively; and
provide for output at a human-machine interface (HMI) an HMI image, wherein the HMI image comprises an indication of at least one of the trip predictive score, the shutdown predictive score, or the runback predictive score.

9. The system of claim 8, wherein the indication of the at least one of the trip predictive score, the shutdown predictive score, or the runback predictive score provides the probability of a trip, a shutdown, a runback, or combination thereof, occurring in the turbine system.

10. The system of claim 9, wherein the indication of the at least one of the trip predictive score, the shutdown predictive score, or the runback predictive score comprises a quick indicator comprising a trip indicator configured to represent the probability of the trip, a shutdown indicator configured to represent the probability of the shutdown, and a runback indicator configured to represent the probability of the runback; wherein the trip indicator, the shutdown indicator, and the runback indicator each comprise a graphical symbol that changes color as the probability of the trip, the shutdown, or the runback changes, respectively.

11. The system of claim 10, wherein each graphical symbol is configured to display a first color when no fault is predicted, to display a second color when potential issues are detected that may cause a fault, and display a third color when a fault is eminent unless something in the industrial process control system changes.

12. The system of claim 10, wherein each graphical symbol is configured to progressively increase in darkness between a low probability and a high probability of the trip, the shutdown, or the runback occurring.

13. The system of claim 8, wherein the HMI image comprises a detailed prediction screen, comprising:
identification data of one or more parameters affecting the at least one of the trip predictive score, the shutdown predictive score, or the runback predictive score; and
an indication of the probability of a trip, a shutdown, a runback, or combination thereof, due to the one or more parameters.

14. The system of claim 8, wherein the HMI image comprises a reset interface configured to enable at least partial reset of the historical data for the one or more components.

15. The system of claim 8, wherein the HMI image comprises a tips section that provides remedial measures to affect the current data relating to the one or more components to reduce the probability of the future faults.

16. A method, comprising:
collecting current parameter data relating to one or more components of a turbine system;
collecting historical data comprising one or more faults and parameter data associated with the faults for the one or more components; and
generating a trip predictive score, a shutdown predictive score, and a runback predictive score based at least in part upon the current parameter data and the historical data, wherein the trip, shutdown, and runback predictive scores represent a probability of a trip, a shutdown, and a runback, respectively, of the turbine system;
wherein generating the trip predictive score, the shutdown predictive score, and the runback predictive score comprises:
determining a current trip predictive score, a current shutdown predictive score, and a current runback predictive score based upon the current parameter data;
determining a historical trip predictive score, a historical shutdown predictive score, and a historical runback predictive score based u on the historical data; and
generating the trip predictive score, the shutdown predictive score, and the runback predictive score by combining the current trip, the current shutdown, and the current runback predictive scores to the historical trip, historical shutdown, and historical runback predictive scores, respectively.

17. The method of claim 16, comprising:
outputting the trip, shutdown, and runback predictive scores to a human-machine interface (HMI) for display of the trip, shutdown, and runback predictive scores to an operator.

18. The method of claim 16, comprising enabling operator intervention to help avoid the trip, the shutdown, and/or the runback based on the trip predictive score, the shutdown predictive score, the runback predictive score, or a combination thereof.

* * * * *